UNITED STATES PATENT OFFICE.

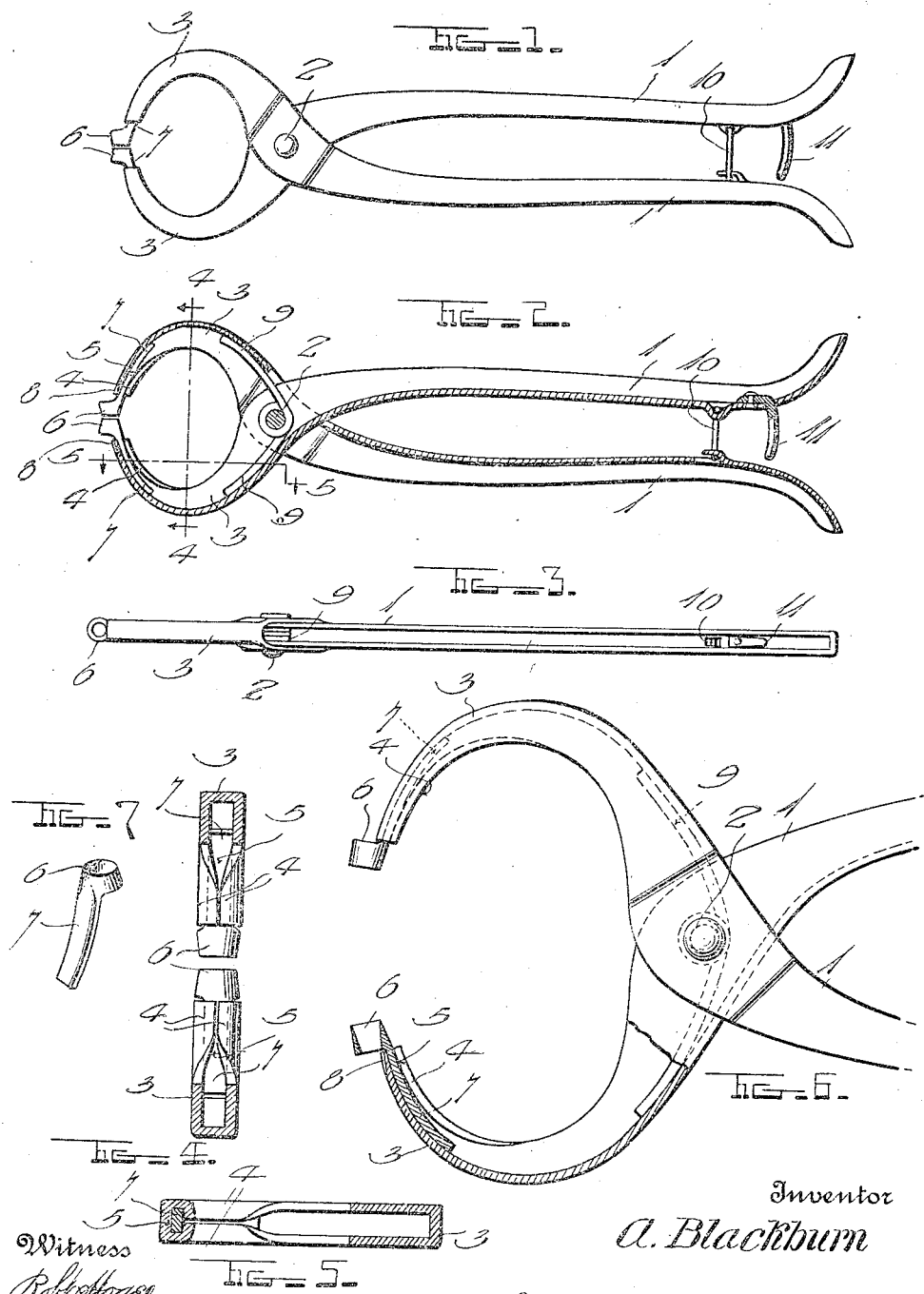

ALVAH BLACKBURN, OF ALUM BANK, PENNSYLVANIA.

STOCK-PUNCH.

1,288,483.  Specification of Letters Patent.  Patented Dec. 24, 1918.

Application filed April 11, 1918. Serial No. 228,014.

*To all whom it may concern:*

Be it known that I, ALVAH BLACKBURN, a citizen of the United States, residing at Alum Bank, in the county of Bedford and State of Pennsylvania, have invented certain new and useful Improvements in Stock-Punches; and I do declare the following to be a full, clear, and exact description of the invention, such as will enable others skilled in the art to which it appertains to make and use the same.

My invention has for its object to provide a simple and inexpensive, yet a highly efficient and durable device for punching holes in the ears and noses of live stock for attaching rings or tags thereto or for purposes of identification, it being intended also that the punches may be made to represent figures, whereby the year of birth may be punched in the animal's ear.

With the foregoing general object in view, the invention resides in the novel features of construction to be hereinafter fully described and claimed, the descriptive matter being supplemented by the accompanying drawing which forms a part of this specification and in which:

Figure 1 is a side elevation of the stock punch;

Fig. 2 is a central longitudinal section thereof;

Fig. 3 is an edge view;

Figs. 4 and 5 are detail sectional views on the planes of the lines 4—4 and 5—5 respectively of Fig. 2;

Fig. 6 is an enlarged side elevation of the front end of the tool with one jaw and punch in section; and Fig. 7 is a perspective view of one of the punches.

In the drawing above briefly described, the numerals 1 designate a pair of handles crossed and pivoted together at 2 and having substantially semi-circular jaws 3 at their front ends, said handles and jaws being formed of metal stamped into channel shape. The side flanges of the jaws 3 are stamped inwardly toward each other at 4 to decrease the cross-sectional size of the jaws and to provide the free ends of said jaws with elongated sockets 5.

A pair of punches 6, here shown in the form of rings, are provided on one edge with elongated curved shanks 7 which are snugly yet removably received in the sockets 5, said punches extending forwardly from the jaws 3 and the ends of the latter being cut away slightly at 8 so that they in no manner interfere with the passage of the removed cartilage or flesh through the punches.

Although the punches are herein shown in the form of rings, I wish it understood that they may be constructed of any desired shapes. For instance, a set of punches may be provided with each tool, said punches being shaped to form numerals from one to nine and zero. It will thus be seen that by first using one pair of punches and then another the year in which the animal was born may be punched in the ear, whereby all stock will bear a permanent record of their birth year. The ring-like punches shown in the drawing are used primarily for punching holes in the nose cartilage of bulls and other fractious animals, so that a ring may be placed therein for the well known purposes. These punches however are also of advantage in forming an opening through the ear of the animal by which to attach an identification tag or the like. It may also be pointed out that the tool may be made in small sizes for piercing the nose cartilage of the animal while sufficiently young to offer little resistance. The opening thus formed will be at hand whenever it should be necessary to insert the ring.

Preferably employed in connection with the construction above described, is a spring 9 which exerts its tension to normally open the tool, and in order to retain the latter in closed position when necessary, a suitable link or the like 10 is provided for connecting the handles 1. Also, to prevent closing of these handles to such an extent as to possibly pinch the user's hand, or injure the punches, a projecting finger 11 is preferably provided on one handle to strike the other.

From the foregoing, taken in connection with the accompanying drawing, it will be obvious that although my invention is of extremely simple and inexpensive nature, it will be highly efficient and durable, particular emphasis being laid upon the novel means for removably attaching the punches 6, whereby to permit differently shaped punches to be applied as required. Since probably the best results are obtained from the features shown and described, these features are preferably followed, but within the scope of the invention as claimed, considerable latitude is allowed for making such changes as occasion may dictate.

I claim:

1. A stock punch comprising crossed handles pivoted together and carrying substantially semi-circular jaws at their front ends, said handles and their jaws being formed of metal stamped into channel shape, the side flanges of the jaws being stamped inwardly toward each other at the free ends of said jaws to decrease the cross-sectional size of said jaws and to form sockets opening through said ends, and a pair of punches having attaching shanks received in said sockets.

2. An article of manufacture comprising a pair of crossed handles pivoted together and carrying substantially semi-circular jaws at their front ends, said handles and their jaws being formed of metal stamped into channel shape and the side flanges of said jaws being stamped inwardly toward each other at the free ends of the latter to reduce the cross-sectional size of said jaws and to form elongated sockets adapted to receive the attaching shanks of a pair of punches.

In testimony whereof I have hereunto set my hand.

ALVAH BLACKBURN.

Witnesses:
H. C. DORR,
W. A. McGREGOR.

Copies of this patent may be obtained for five cents each, by addressing the "Commissioner of Patents, Washington, D. C."